United States Patent
Storstein et al.

(10) Patent No.: US 6,821,447 B1
(45) Date of Patent: Nov. 23, 2004

(54) FRICTION MEMBER AND A METHOD FOR ITS SURFACE TREATMENT

(75) Inventors: Torkil Storstein, Oslo (NO); Claes Kuylenstierna, Mölnlycke (SE); Jouko Kalmi, Skövde (SE)

(73) Assignees: Norsk Hydro ASA, Oslo (NO); Volvo Car Corporation, Gothenburg (SE)

( * ) Notice: Subject to any disclaimer, the term of this patent is extended or adjusted under 35 U.S.C. 154(b) by 0 days.

(21) Appl. No.: 09/914,923

(22) PCT Filed: Mar. 8, 2000

(86) PCT No.: PCT/NO00/00083

§ 371 (c)(1),
(2), (4) Date: Oct. 31, 2002

(87) PCT Pub. No.: WO00/53949

PCT Pub. Date: Sep. 14, 2000

(30) Foreign Application Priority Data

Mar. 10, 1999 (NO) .......................................... 19991146

(51) Int. Cl.[7] .............................. C23F 1/00; C23F 3/02; C23F 3/04
(52) U.S. Cl. .............................. 216/11; 216/77; 216/79; 216/102; 216/103; 205/640; 205/717; 205/705; 205/771; 188/251 M; 192/107 M
(58) Field of Search ................................ 428/687, 614, 428/621, 627, 630, 632, 633, 650, 651, 652, 409, 450, 469, 698, 704, 539.5, 908.8; 188/19 A, 251 A, 251 M; 216/7, 11, 39, 56, 77, 79, 99, 102, 100, 103, 108; 192/107 M; 205/640, 717, 705, 771

(56) References Cited

U.S. PATENT DOCUMENTS

| | | | | |
|---|---|---|---|---|
| 3,932,228 A | * | 1/1976 | Sugiyama et al. | 204/26 |
| 4,079,720 A | * | 3/1978 | Takahashi | 123/193 CP |
| 4,180,622 A | * | 12/1979 | Burkhard et al. | 428/564 |
| 4,475,983 A | * | 10/1984 | Bader et al. | 156/656 |
| 5,487,999 A | * | 1/1996 | Farnworth | 437/7 |
| 5,521,015 A | | 5/1996 | Murphy | 428/545 |
| 5,712,029 A | * | 1/1998 | Tsugawa et al. | 428/323 |
| 5,765,667 A | * | 6/1998 | Ross et al. | 188/218 X |
| 5,972,090 A | | 10/1999 | Hörth | 106/36 |
| 5,980,792 A | * | 11/1999 | Chamlee | 264/40.1 |
| 5,989,729 A | * | 11/1999 | Takagi et al. | 428/614 |
| 6,302,246 B1 | * | 10/2001 | Naumann et al. | 188/218 X |
| 6,381,837 B1 | * | 5/2002 | Baker et al. | 29/840 |
| 6,458,466 B1 | * | 10/2002 | Jones et al. | 428/469 |

FOREIGN PATENT DOCUMENTS

| | | | |
|---|---|---|---|
| EP | 622476 | * | 3/1994 |
| EP | 0622476 | * | 11/1994 |
| JP | 63-169365 | * | 7/1988 |
| WO | 9205292 | | 4/1992 |
| WO | 9726465 | | 7/1997 |

* cited by examiner

*Primary Examiner*—Michael La Villa
(74) *Attorney, Agent, or Firm*—Wenderoth, Lind & Ponack L.L.P.

(57) ABSTRACT

A method of surface treatment of friction members includes providing a friction member made of PMMC material. A transfer layer is formed on the active surface of the friction member of removing the top layer of the matrix material to expose a surface with the embedded reinforcing particles.

5 Claims, 2 Drawing Sheets

U S 6,821,447 B1

FRICTION MEMBER AND A METHOD FOR ITS SURFACE TREATMENT

BACKGROUND OF THE INVENTION

The present invention relates to a method for surface treatment of friction members like brake discs, drums, clutch parts and, more particularly, to treatment of PMMC based members and friction members provided thereby.

Conventional brake discs are presently made of ferrous alloys/cast iron having satisfactory performance and remaining operative even at substantially elevated temperatures up to and above 700° C.

However, the present tendency in the automotive industry to reduce the total weight of vehicles challenges new lighter materials to also penetrate this particular segment of vehicle construction. Furthermore, improved corrosion resistance, as well as wear resistance, which increase the lifetime of the friction members up to the expected life period of the vehicles, are traits when looking for replacement of the present ferrous materials.

Consequently, several patent applications have been filed world-wide recently disclosing use of PMMC (Particle Metal Matrix Composite, such as an Al-alloy matrix reinforced by ceramic particles) based components used for different actual applications in vehicles. Shortcomings in common for all these applications based on PMMC base material are a softening phenomena at elevated temperatures, something which results in scoring and even plastic deformation of the members' surface, thus considerably limiting the maximum allowed operating temperatures of the members. Therefore, as a remedy, it is instrumental to provide the basic PMMC-made friction members either with a special composite/-ceramic coating layer (thermal spraying of ceramics), or with a transfer surface layer.

The provision of an alternative transfer layer requires the layer to be both stable (adherent to the substrate and reliable) and homogeneous. Furthermore, fast formation of the layer having a sufficient thickness is also important both from a manufacturing, cost and performance point of view.

One feasible way to cope with the task of increasing the maximum operating temperature is simply to increase the volume percentage of reinforcing particles. Unfortunately, two major disadvantages connected with this "solution", namely increased costs of the PMMC base material and difficulties related to production/casting and especially cutting/-machining of the surface, eliminate this as a possibility for a cost efficient manufacturing method.

SUMMARY OF THE INVENTION

It is therefore an object of the present invention to provide a novel, fast and cost efficient method of manufacturing friction members that avoid the above mentioned drawbacks and difficulties connected to the conventional methods and products. Another object of the present invention is to provide a fast developing and homogeneous transfer layer exhibiting more stable friction properties, especially at high operating temperatures. Still another object of the present invention is to provide better protection for the base matrix material against scoring. Still another object of the present invention is to provide better protection for the base matrix material against scoring. These and other objects and features of the present invention are met by a method of manufacturing friction members as discussed below.

BRIEF DESCRIPTION OF THE DRAWINGS

The invention will now be described in detail in the following by way of examples of preferred embodiments of the manufacturing method and the resulting members referring to FIGS. 1–4, wherein.

DETAILED DESCRIPTION OF THE INVENTION

Figure 1:
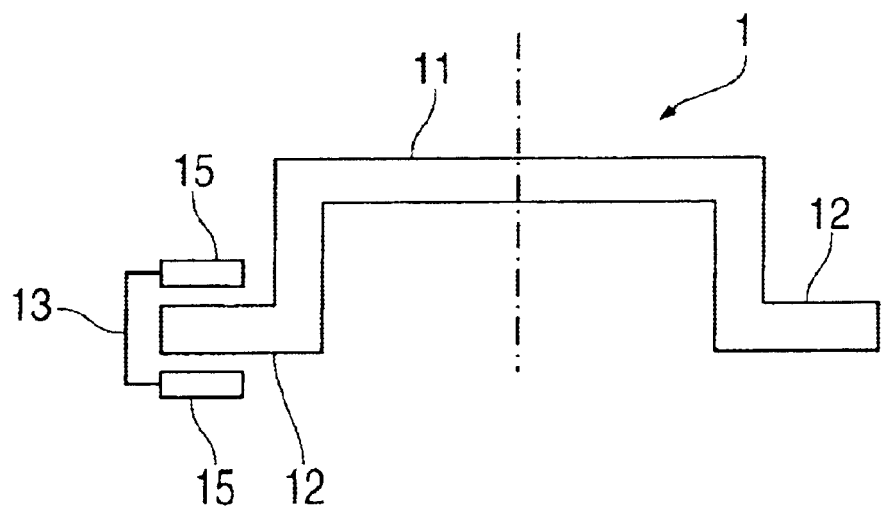
FIG. 1 is a perspective view showing a typical disc brake system.
Figure 2:
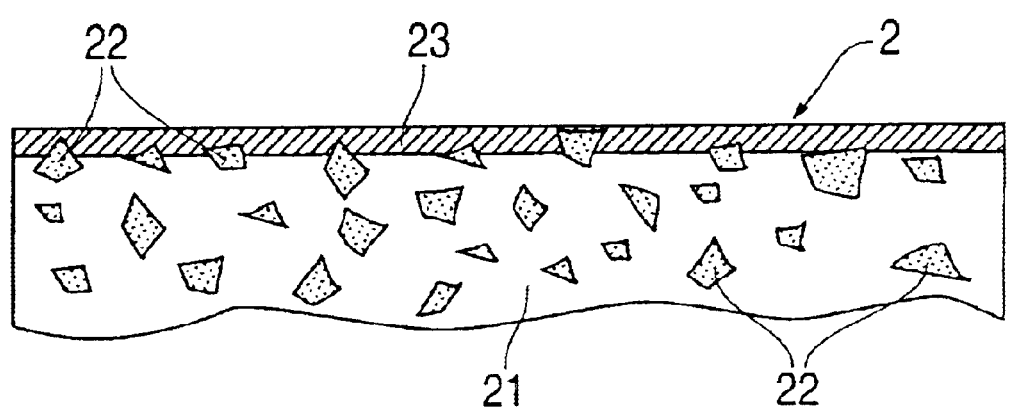
FIG. 2 is a schematic view illustrating, in principle, the novel surface topography of the friction member treated in accordance with the present invention.

Referring to FIGS. 1 and 2, FIG. 1 shows a disc brake system 1 in which the brake disc 11 is the rotating part which together with the friction linings 15 held in place by the caliper 13 creates the friction. Although a brake disc is shown in the drawings, the present invention is also applicable to clutch plates.

The novel surface treatment according to the invention is applied to the friction surfaces 12 of the brake disc.

FIG. 2 illustrates schematically a detailed view of the surface of the member (disc) 12 treated in accordance with the present invention.

Contrary to the present practice and trend to add a special surface layer (e.g., in the form of a composite or sprayed ceramic layer) the gist of the present novel treatment method lies in a selective partial removal of the base matrix material from the active to be frictional surface(s) of the member.

FIG. 2 shows in a cross sectional view the (top) surface 2 of the brake disc 11 in which the original top layer depicted as 23 is removed, most advantageously by chemical etching. This treatment results in a novel surface topography including a surface with reinforcing (ceramic) particles 22 protruding from the matrix 21. Later, during the initial break-in activation of the brake system, the particles 22 become an integrated part of the transfer layer created through initial wear and material transfer from the lining (pad) material. The resulting increased reinforcement of the transfer layer will provide better protection of the matrix alloy from temperature and shear forces.

Tests conducted on samples of PMMC discs surface treated in accordance with this method confirm formation of a fast developing adherent and homogenous transfer layer exhibiting substantially improved performance characteristics of the treated member.

Furthermore, tests have shown that etching increases the pad wear during the initial use of the disc during the creation of the transfer layer. The degree of etching should therefore be chosen to reach an acceptable initial pad wear. After creation of the transfer layer the actual pad wear falls to a lower level.

EXAMPLES

Samples of brake discs made of two different AlSiMg matrix alloys reinforced by SiC particles in an amount of 10 to 30 vol % having a size in a range from 5–30 $\mu$ have been subjected to chemical etching applying a solution of NaOH in concentrations from 5–30% up to 20 minutes. Comparison to the reference samples based on the measurement of surface roughness, friction and performance at elevated temperatures shows improved characteristics on all measured parameters.

Figure 3:
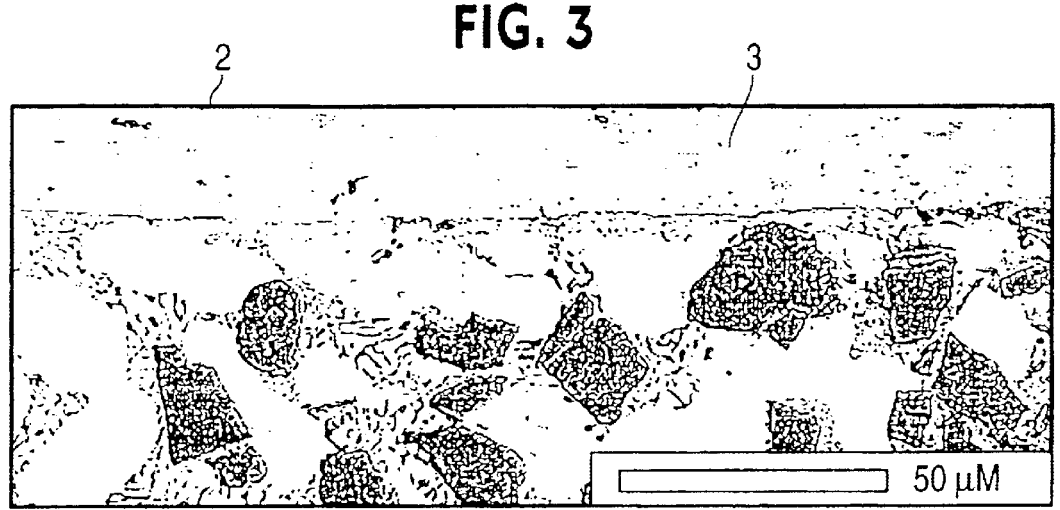
FIG. 3 is a microscope image of an untreated surface.
Figure 4:
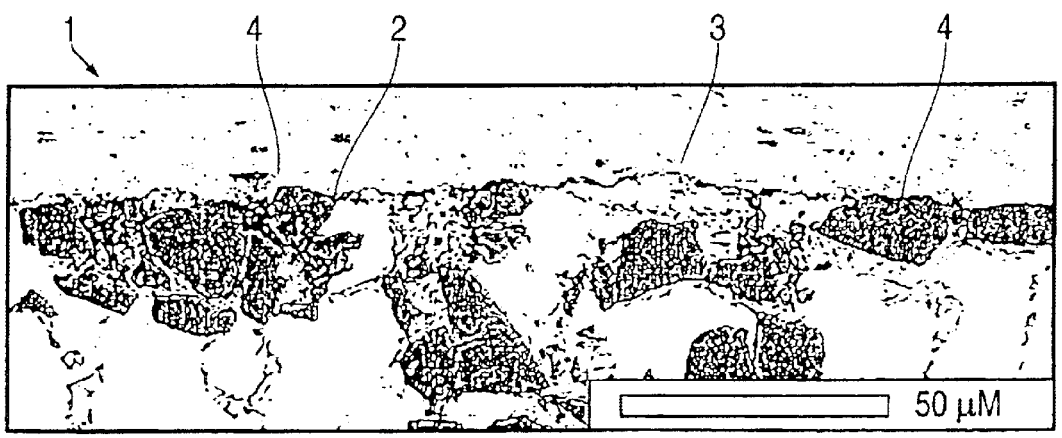
FIG. 4 is a microscope image showing the same surface of FIG. 3, but after exposure to an etching agent as described in the following under Examples.

A relatively short etching time proved to be adequate to remove a sufficient amount of the aluminium matrix, allowing the SiC particles to protrude from the surface of the brake disc as illustrated by the attached FIGS. 3 and 4 showing sample surfaces before and after the etching treatment according to the present invention, respectively.

The actually-applied disc brake samples were made of AlSiMg alloy added 20 weight % of SiC particles. The surfaces 2 of the brake discs 11 were exposed for a period of 2 minutes to 12 weight % water solution of NaOH. (Reference number 3 depicts an Al-foil material applied on the samples as protection for the surfaces prior to microscopic evaluation of the achieved results).

As clearly illustrated in FIG. 4, an exposure time of 2 minutes was sufficient to provide an etched surface 2 with SiC particles 4 protruding from the surface 2.

Generally, an etching time from 1–3 minutes and an application of 12.5 weight % NaOH solution at room temperature is apparently sufficient to achieve an adequate degree of etching of the surface. Prolonged etching (in excess of 5 minutes) can result in loosening of SiC particles. The temperature and the control of the flow of the etching agent will determine the choice of optimal etching time.

The present invention is not limited to the above-described examples of the preferred mode of the surface treatment. Thus, other (similar) methods of surface treatment (such as electrochemical pickling or chemical etching by means of an appropriate acid) could be used without departing from the spirit and scope of the present invention. In addition, alkali-based etching agents other than the exemplified NaOH, such as KOH, could be used. Also, other types of PMMC material with other reinforcing particles like $Al_2O_3$ instead of the above described SiC-reinforced Al-matrix are the most practical alternatives.

What is claimed is:

1. A method of forming vehicle components, said method comprising:

integrally forming a friction member on either a brake disk, a clutch plate or a brake disk and a clutch plate, the friction member being formed of a PMMC material including an Al-alloy matrix material and ceramic reinforcing particles embedded in the matrix material; and forming a transfer layer on a friction surface of the friction member, said forming of the transfer layer including removing the top surface layer of the matrix material so as to expose a surface of the ceramic reinforcing particles to thereby increase a friction coefficient of the friction surface of the friction member, said removing of the top surface layer of the matrix material comprising chemical etching of the PMMC material.

2. The method of claim 1, wherein said chemical etching comprises applying NaOH in a concentration in a range of 5% to 30% by weight as the etching agent.

3. The method of claim 1, wherein said chemical etching comprises applying an acid reagent as the etching agent.

4. The method of claim 1, wherein said chemical etching comprises applying KOH as the etching agent.

5. A method of forming vehicle components, said method comprising:

integrally forming a friction member on either a brake disk, a clutch plate, or a brake disk and a clutch plate, the friction member being formed of a PMMC material including an Al-alloy matrix material and ceramic reinforcing particles embedded in the matrix material, and forming a transfer on a friction surface of the friction member, said forming of the transfer layer including removing the top surface layer of the matrix material so as to expose a surface of the ceramic reinforcing particles to thereby increase a friction coefficient of the friction surface of the friction member, wherein said removing of the top surface layer of the matrix material comprises electrochemical pickling of the PMMC material.

* * * * *